US007840697B2

(12) United States Patent
Nishi

(10) Patent No.: US 7,840,697 B2
(45) Date of Patent: Nov. 23, 2010

(54) LINE CONCENTRATOR, EXTERNAL DEVICES, INFORMATION PROCESSING SYSTEM INCLUDING THEM, AND METHOD FOR MANAGING INFORMATION PROCESSING SYSTEM

(75) Inventor: Akihiro Nishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 703 days.

(21) Appl. No.: 10/544,474

(22) PCT Filed: Jan. 27, 2004

(86) PCT No.: PCT/JP2004/000703

§ 371 (c)(1), (2), (4) Date: Aug. 4, 2005

(87) PCT Pub. No.: WO2004/071026

PCT Pub. Date: Aug. 19, 2004

(65) Prior Publication Data

US 2006/0140698 A1    Jun. 29, 2006

(30) Foreign Application Priority Data

Feb. 5, 2003    (JP)    ............................. 2003-028590

(51) Int. Cl.
*G06F 15/173*    (2006.01)
(52) U.S. Cl. ....................... 709/238; 709/201; 709/223; 358/1.15
(58) Field of Classification Search ................. 709/212, 709/249, 238; 400/62; 58/1.15; 718/102–108
See application file for complete search history.

(56) References Cited

U.S. PATENT DOCUMENTS

| 5,220,674 | A  | * | 6/1993 | Morgan et al. | ............... 709/223 |
| 5,742,587 | A  | * | 4/1998 | Zornig et al. | ................ 370/235 |
| 6,029,198 | A  | * | 2/2000 | Iizuka | ......................... 709/223 |
| 6,101,192 | A  | * | 8/2000 | Wakeland | .................... 370/429 |
| 6,697,870 | B1 | * | 2/2004 | Cafarelli et al. | ............. 709/233 |
| 6,785,727 | B1 | * | 8/2004 | Yamazaki | .................... 709/229 |
| 6,924,906 | B1 | * | 8/2005 | Schwier et al. | ............. 358/1.6 |
| 7,088,727 | B1 | * | 8/2006 | Short et al. | .................. 370/401 |
| 7,457,857 | B1 | * | 11/2008 | Crayford et al. | ............ 709/223 |
| 2001/0046065 | A1 | * | 11/2001 | Furukawa et al. | .......... 358/1.15 |

(Continued)

FOREIGN PATENT DOCUMENTS

CN    1385993 A    12/2002

(Continued)

*Primary Examiner*—Douglas B Blair
*Assistant Examiner*—Christopher D Biagini
(74) *Attorney, Agent, or Firm*—Birch, Stewart, Kolasch & Birch, LLP

(57) ABSTRACT

A line concentrator and external devices wherein data transmitted from external devices within a system and wherein the processing of the received data can be efficiently executed without increasing load on the network is provided. A print system includes a printer hub, a shared printer and a shared MFP. The printer hub includes a switching hub for receiving data from another network and a repeater hub located in the downstream of the switching hum. The switching hub transmits the received data only to designated ones among the connected devices, and transmits the received data to the repeater hub. The repeater hub transmits the data, which is supplied from the switching hub, to all of the image forming apparatuses (shared printer and shared MFP) included in the print system.

16 Claims, 11 Drawing Sheets

U.S. PATENT DOCUMENTS

| | | |
|---|---|---|
| 2002/0169985 A1 | 11/2002 | Purpura |
| 2003/0053129 A1* | 3/2003 | Morooka et al. ........... 358/1.15 |
| 2003/0081630 A1* | 5/2003 | Mowery et al. ............. 370/466 |
| 2003/0090697 A1* | 5/2003 | Lester et al. ............... 358/1.14 |
| 2003/0229691 A1* | 12/2003 | Ishimoto .................... 709/223 |
| 2004/0170460 A1 | 9/2004 | Mokuya et al. .............. 400/76 |
| 2005/0036167 A1* | 2/2005 | Atsumi ...................... 358/1.15 |
| 2005/0120381 A1* | 6/2005 | Yamaguchi ................. 725/105 |

FOREIGN PATENT DOCUMENTS

| | | |
|---|---|---|
| EP | 1 262 865 A2 | 12/2002 |
| JP | 09-319533 A | 12/1997 |
| JP | 11-331453 A | 11/1999 |
| JP | 2000-3259 A | 1/2000 |
| JP | 2000-20269 A | 1/2000 |
| JP | 2000-305883 A | 11/2000 |
| JP | 2000-326597 A | 11/2000 |
| JP | 2001-66950 A | 3/2001 |
| JP | 2001-337794 A | 12/2001 |
| JP | 2002-32323 A | 1/2002 |
| JP | 2003-271348 A | 9/2003 |

* cited by examiner

LINE CONCENTRATOR, EXTERNAL DEVICES, INFORMATION PROCESSING SYSTEM INCLUDING THEM, AND METHOD FOR MANAGING INFORMATION PROCESSING SYSTEM

TECHNICAL FIELD

The present invention relates to an information processing system, such as a print system, to which a plurality of external devices, such as a photocopier, a scanner, or a MFP (Multi Function Printer), are connected through network, and in particular relates to a line concentrator and an external device, both of which carry out arbitration of jobs among the plurality of external devices, an information processing system including the line concentrator and the external device, and a management method of the information processing system.

BACKGROUND ART

Recently, as a result of advancement in performance and price-reduction of computer, a network system that processes information transmitted from a computer with common peripheral units has been used on a network, especially on a LAN (Local Area Network).

An example of the peripheral unit to be shared is an image forming apparatus such as a duplicating machine, a scanner, or a MFP. Establishing a LAN network system by connecting a plurality of image forming apparatuses allows enforcement of print jobs transmitted from computers by a plurality of image forming apparatuses.

In the network system, a device to output a print job is designated usually when the outputting of the print job is ordered, and each print job to be outputted is transmitted to a designated device.

However, in the network system, requests for job outputting may be concentrated on a certain image forming apparatus. Consequently, there may arise a situation in which a device has a job queue although another device is available for outputting a job. As a result, image forming apparatuses are not efficiently used.

Further, in a print system in which a plurality of users share a plurality of image forming apparatuses, to process print data supplied from the outside, in some cases the print data transmitted to one image forming apparatus has to be processed by another printer, depending upon the print conditions or the print data has to be re-transmitted because the amount of data of print job so large that more than one image forming apparatuses are involved in the process.

Further, in the case in which a MFP is used as an image forming apparatus, when there is no available image forming apparatus at the time when another user is carrying out copying with the MFP, primarily, the print data to be processed by the MFP cannot be re-transmitted to another image forming apparatus. Therefore, it is necessary to distribute and transmit jobs in such a way in which an image forming apparatus that is not currently carrying out processing always exists.

In order to solve foregoing problems, a suggestion has been made on an image output system in which negotiation in job distribution is carried out among a plurality of image forming apparatuses in network so that utilization effectiveness of image forming apparatuses is improved. In addition, the image output system allows the job distribution to be adjusted among the plurality of image forming apparatuses without increasing load on the network.

For example, in Reference 1, a Japanese patent application laid-open gazette "TOKUKAIHEI 9-319533 (published on Dec. 12, 1997)", an image forming system is disclosed. In the image forming system, printers sharing common characteristics are grouped so as to automatically distribute output data to printers having the functions that the user desires. The image forming system puts printers having the same functions into groups and manages the printers. Therefore, when processing is carried out, a group of printers is designated depending upon function necessary for the processing, instead of designating an individual printer. Then, output data is distributed to a plurality of printers within the group and is processed.

Other examples of an image output system are disclosed in Japanese patent application laid-open gazettes such as "TOKUKAI 2000-003259 (published on Jan. 7, 2000)", "TOKUKAI 2001-066950 (published on Mar. 16, 2001)", and "TOKUKAIHEI 11-331453 (published on Nov. 30, 1999)".

However, the conventional image output systems mentioned above have the following problems.

In the printer system disclosed in Reference 1, printers having the same function are grouped, and a print job is transmitted to all of the printers within the group. Therefore, dynamic distribution of a print job flexibly corresponding to changes in processing status cannot be expected, and processing efficiency may be decreased.

Specifically, in the printer system, because the distribution of processing is determined in advance, data needs to be re-distributed and re-transmitted when the planned distribution cannot be done in situations such that an external device is performing another process. Moreover, because a server that distributes received data determines the distribution, and subsequently transmits the data to an external device, the quantity of transmitted data increases.

Therefore, in the image forming apparatus, subsequent data is received immediately prior to the end of processing of a print job. However, the foregoing method is applicable only to a system, such as a system adopting a co-axial cable, in which all of image forming apparatuses can concurrently receive print data. Therefore, the method can be applied to a bus-type LAN which uses a co-axial cable, but cannot be applied to a star-type LAN configuration using a twisted-pair cable.

In addition, in the printer system disclosed in Reference 1, printer functions necessary for processing a print job that is actually transmitted are different from the functions available in the printer. Therefore, a mechanism for dynamically distributing output data to an appropriate group of printers is necessary. However, Reference 1 is silent on this matter.

Embodiments of the present invention are presented in view of the above problems, and an object of the present invention is (i) to provide a line concentrator and external devices, in which data transmitted from an external network can be received by all of the external devices within a system and in which processing of received data can be efficiently executed, without increasing load on the network, (ii) to provide an information processing system including them, and (iii) to provide a method for managing the information processing system.

DISCLOSURE OF INVENTION

In order to achieve the above-mentioned object, a line concentrator in the present invention is characterized in that the line concentrator unifies a plurality of external devices being connected to a network and connects the unified external devices to another network. The line concentrator includes destination selection delivery means for receiving data from another network, and transmits information supplied from the plurality of external devices to a designated destination, the information regarding processing statuses of the respective external devices. The line concentrator further includes received data delivery means for transmitting the data supplied from the destination selection delivery means to all of the external devices being connected to the network.

In the above structure, combining the received data delivery means and the destination selection delivery means makes it possible to transmit data to all of the external devices if the data should be transmitted to all of the external devices in the network, and to transmit data only to a designated destination if the data should be transmitted only to a certain external device.

In other words, the line concentrator plays a role of unifying and connecting all of the external devices being connected to a network to another network, and includes a received data delivery means and a destination selection delivery means.

The received data delivery means is a delivery means such as a repeater hub, and delivers received data to all of the external devices being connected.

A destination selection delivery means is a delivery means such as a switching hub, and delivers received data only to a designated destination.

The line concentrator includes a combination of the two kinds of delivery means, each of the delivery means has a different function from each other. Therefore, for example in an information processing system including a destination selection delivery means, such as a switching hub, used together with a star-type LAN configuration using a twisted-cable that is becoming common in LANs, data transmitted from other networks can be transmitted to all of the external devices being connected to network through a received data delivery means.

In addition, when receiving information regarding a processing status from the respective external devices, the destination selection delivery means can designate all of the external devices being connected as destinations and can transmit the information to the designated destinations. On the other hand, for example, image data read by an external device including a scanner function can be transmitted to a designated external device or another selected network, and therefore transmission of image data to unnecessary destinations can be prevented.

Therefore, by using a more appropriate one of the two delivery means depending upon the received data, data received from another network can be delivered to all of the external devices without increasing load on the network. In addition, the destination selection delivery means can designate all of the external devices and deliver the information regarding processing status of the respective external devices to all of the external devices. Accordingly, the plurality of external devices within the network that are included in the information processing system can be efficiently utilized depending upon the category of received data, performance of an external device or the like. Further, with respect to the data in which a destination of transmission should be selected, the data can be transmitted only to the designated destination through the destination selection delivery means. Therefore, an information processing system having security function can be established.

In order to achieve the above-mentioned object, a line concentrator in the present invention is characterized in that the line concentrator unifies a plurality of external devices being connected to a network and connects the unified external devices to another network. The line concentrator includes (i) destination selection delivery means for transmitting data, which is supplied from another network, only to a designated destination, (ii) first received data delivery means for transmitting the data supplied from the destination selection delivery means to all of the external devices being connected to the network, and (iii) second received data delivery means for transmitting information, which is supplied from the external devices, to all of the external devices in the network and to the destination selection delivery means, the information regarding current processing statuses of the respective external devices.

In the above structure, because data received from another network and information regarding processing status of the respective external devices can be transmitted to all of the external devices within the network, the plurality of external devices can be efficiently utilized.

In other words, the line concentrator plays a role as a hub that unifies all of the external devices being connected to the network as one device and connects the device to another network, and includes the first received data delivery means, the second received data delivery means, and the destination selection delivery means.

The first received data delivery means and the second received data delivery means are delivery means such as a repeater hub, and deliver the received data to all of the devices being connected.

The destination selection delivery means is a delivery means such as a switching hub, and delivers the received data only to the designated destination.

In the line concentrator, the destination selection delivery means is connected to an external device through the first received data delivery means and the second received data delivery means.

As a result, the data received from outside is transmitted to the first received data delivery means through the destination selection delivery means.

Here, because the first received data delivery means delivers the received data to all of the devices being connected, all of the external devices in the network can receive the data received from another network.

In all of the external devices in the network that received the data, an external device is selected, and the selected external device executes the data processing.

Each external device transmits information regarding its own current processing status to the second received data delivery means. Here, the second received data delivery means, likewise the first received data delivery means, transmits the received data to all of the devices connected. Therefore, the information regarding processing status is transmitted to the external devices other than the one that executed the processing and to the destination selection delivery means. As a result, all of the external devices share the data transmitted from another network to the line concentrator, and can recognize the processing status of the other external devices. This enables selection of the most adequate external device for execution of the processing of the received data, and the selected external device can execute the data processing.

Therefore, without increasing load on the network, the external devices in the network can be efficiently utilized for execution of the data processing.

Further, with respect to information directly obtained in an external device, the information will be always transmitted through the destination selection delivery means so that transmission of important information to another network can be prevented. Accordingly, an information processing system having security function against the other network can be established.

An example of data obtained in the external device would be image data read in by a scanner in the case in which the external device includes a scanning function.

It is preferable that the destination selection delivery means include identification means for identifying a type of content of data supplied from another network.

This enables to transmit only a necessary portion of the received data to an external device.

For example, in the case in which the external device is an image forming apparatus, by differentiating print data and other data, such as control data, status data, or others, that are included in the received data, it becomes possible to transmit only print data to the image forming apparatus in the network.

As a result, only the data necessary for execution of the processing is transmitted to the external device. Therefore, the efficiency of the processing in the external device can be improved.

It is preferable that the line concentrator include arbitration means for selecting an external device that is the most adequate for processing of the data, based upon information regarding processing statuses of the respective external devices, the information supplied from all of the external devices being connected to the network.

From this, it is possible in the line concentrator to select an external device that is adequate for processing the received data based upon the processing status of the respective external devices.

In other words, for example, in the case in which the external device is an image forming apparatus, the line concentrator, as a print server, can consolidate the print job and select an outputting device that is most adequate for processing the received data based upon the processing status of a job, the category of a job, or the function/performance of a device.

Because an external device that is most adequate for processing the data is selected in the line concentrator, the external devices are not required to have function of mutually adjusting the distribution of processing. Therefore, the respective external devices do not have to carry out any processing necessary for the arbitration, and processing efficiency can be improved.

In order to achieve the above-mentioned object, external devices in the present invention are characterized in that the external devices are unified by a line concentrator connected to a network and are connected to the line concentrator. Each of the external devices includes (i) receiving means for receiving data which has been supplied from another network to the line concentrator and (ii) transmitting/receiving means which, when the external device is executing processing, transmits information regarding a data processing status to an external device in the network, and which receives information regarding a data processing status from another external device which is executing processing.

In the above structure, data received from another network and transmitted to all of the external devices in the network is received by the receiving means. Information regarding processing status of the data is transmitted/received to/from the other external device(s) within the same network through a transmitting/receiving means.

This allows the respective external devices to recognize whether the other external device(s) are in use, and therefore the plurality of external devices in the network can be efficiently utilized.

Further, because the receiving means included in the external device is read-only and does not transmit data, a problem that data received from another network cannot be received caused by a collision of data can be prevented. Therefore, there is no need for re-transmitting the data to an external device that did not receive the data.

In order to achieve the above-mentioned object, an information processing system in the present invention is characterized in that the information processing system includes (i) a plurality of external devices being connected to a network and (ii) a line concentrator that unifies the plurality of external devices and connects the unified external devices to another network. The line concentrator includes (i) destination selection delivery means for receiving data from another network, and transmits information supplied from the plurality of external devices to a designated destination, the information regarding processing statuses of the respective external devices and (ii) received data delivery means for transmitting the data that the destination selection delivery means received from another network, to all of the external devices being connected to the network. Each of the external devices includes (i) receiving means for receiving data which has been supplied from another network to the line concentrator and (ii) transmitting/receiving means which, when the external device is executing processing, transmits information regarding a data processing status to an external device in the network, and which receives information regarding a data processing status from another external device which is executing processing.

In the above structure, data supplied from another network is transmitted to all of the external devices being connected to the network, and the processing status of the respective external devices is shared with the other external device(s). This enables efficient utilization of a plurality of external devices and selection of a destination to which data that does not have to be transmitted to another network, an external device, or others is transmitted.

In other words, the information processing system includes a line concentrator that plays a role in which all of the external devices being connected to the network are unified and are connected to another network, and a plurality of external devices being connected to the line concentrator.

The line concentrator includes a received data delivery means and a destination selection delivery means, and plays a role in which all of the external devices being connected to the network are unified and are connected to another network.

The received data delivery means is a delivery means such as a repeater hub and delivers received data to all of the external devices being connected.

The destination selection delivery means is a delivery means such as a switching hub and delivers received data only to a designated destination.

The external device is, for example, an image forming apparatus that receives data such as print job and forms an image. Examples of the image forming apparatus include a printer or a MFP (Multi Function Printer). The external device includes a receiving means that receives data from the received data delivery means of the line concentrator, and a transmitting/receiving means that transmits/receives data to/from the destination selection delivery means.

The information processing system is structured with a combination of a line concentrator including two kinds of delivery means, each having different function, and an external device including a communication means.

Data received from another network is transmitted, in the line concentrator, from the received data delivery means to all of the external devices in the network through the destination selection delivery means. Then, in all of the external devices, the receiving means receives the data.

Because the data received from another network is transmitted in advance to all of the external devices being connected to the line concentrator, there is no need for additionally transmitting the data to an external device selected for execution of processing of the data.

Further, information regarding processing status is created in each of the external devices is transmitted from the transmitting/receiving means to the destination selection delivery means of the line concentrator. The destination selection delivery means designates all of the external devices in the network as a destination and transmits the information thereto. Consequently, all of the external devices can recognize the processing status of the other external device(s).

Therefore, based upon the category or the like of the received data and information regarding processing status of the respective external devices, the external device itself can select an external device that is most adequate for executing the processing, and the selected external device can execute the processing of the data.

Further, the data obtained in the external device is transmitted from the transmitting/receiving means of the external device to the destination selection delivery means. The destination selection delivery means can transmit the data to a designated external device or to another network.

This enables efficient utilization of a plurality of external devices to execute the processing of the received data concurrently with reducing the load on the network. In addition, because important data, such as image data, that is directly obtained in the external device, for example, can be transmitted only to a designated destination, an information processing system having security function can be established.

This structure can be applied to a star-type LAN configuration using a twisted cable that is becoming common in LANs, as a network connecting the line concentrator and the external device, and which includes a switching hub.

In order to achieve the above-mentioned object, an information processing system in the present invention is characterized in that the information processing system includes (i) a plurality of external devices being connected to a network and (ii) a line concentrator that unifies the plurality of external devices and connects the unified external devices to another network. The line concentrator includes (i) destination selection delivery means for transmitting data, which is supplied from another network, only to a designated destination, (ii) first received data delivery means for transmitting the data supplied from the destination selection delivery means to all of the external devices being connected to the network, and (iii) second received data delivery means for transmitting information, which is supplied from an external device, to all of the external devices in the network and to the destination selection delivery means, the information regarding current processing statuses of the respective external devices. Each of the external devices includes (i) receiving means for receiving data from the first received data delivery means of the line concentrator and (ii) transmitting/receiving means for transmitting/receiving the information regarding a processing status to/from the second received data delivery means of the line concentrator.

In the above structure, because data received from another network and information regarding processing status of all of the external devices can be transmitted to all of the external devices in the network without loading on the network, a plurality of external devices in the network can be efficiently utilized. In addition, leak of important data to another network can be prevented.

In other words, the information processing system is structured with a combination of a line concentrator including two kinds of delivery means, each having a different function, and an external device including a communication means.

The line concentrator plays a role as a hub that unifies and connects all of the external devices connected to the network to another network, and includes a first received data delivery means, a second received data delivery means, and a destination selection delivery means.

The first received data delivery means and the second received data delivery means are delivery means such as a repeater hub, and deliver received data to all of the devices being connected.

The destination selection delivery means is a delivery means such as a switching hub, and delivers received data only to a designated destination.

The external device is an image forming apparatus that receives data such as a print job and forms an image. Examples of the image forming apparatus are a printer or a MFP (Multi Function Printer). The external device includes a receiving means that receives data from the received data delivery means of the line concentrator and a transmitting/receiving means that transmits/receives data to/from the destination selection delivery means.

In the information processing system, the destination selection delivery means is connected to an external device through the first received data delivery means and the second received data delivery means.

Therefore, data received from outside is transmitted to the received data delivery means through the destination selection delivery means.

Because the received data delivery means delivers received data to all of the devices being connected, all of the external devices in the network can receive data received from another network.

In each of the external devices in the network that receive the data, information regarding the external device's processing status is transmitted to the second received data delivery means. Because the second received data delivery means transmits the received data to all of the devices being connected, the information regarding the processing status is transmitted to all of the external devices and the destination selection delivery means. Consequently, all of the external devices share the data received from another network, and receive the information regarding the processing status of the other external device. Therefore, an external device itself can select a most adequate external device at this time, and the selected external device can execute the processing of the data.

This enables to efficiently utilize the external devices in the network and execute the processing of the data without loading on the network.

Further, because information that is directly obtained in the external device is always transmitted through the destination selection delivery means, transmission of important information to another network can be prevented. Therefore, an information processing system having security function against another network can be established.

An example of the data obtained in the external device would be image data read in through a scanner in the case in which the external device includes scanning function.

It is preferable that the external devices and the line concentrator be connected through wireless communication means.

This enables elimination of cables connecting the line concentrator and each external device, and therefore flexibility of a layout of the device and others can be increased.

It is preferable that the wireless communication means used for transmitting data from the line concentrator to all of the external devices in the network is UWB.

This allows a high-speed communication, due to the characteristic of a UWB, in the case in which the external devices are grouped and are disposed close to each other or close to a hub, within approximately 10 meters.

Further, because a UWB has a characteristic in which its throughput rapidly decreases as the distance between external devices increases and does not employ a carrier wave, leakage of data due to interception in the air can be prevented. Consequently, an information processing system can be obtained in which security function is enhanced.

It is preferable that the external devices be image forming apparatuses.

This enables establishment of a print system in which image forming apparatuses in the network adjust their schedule for processing of a print job received from another network so as to efficiently utilize a plurality of image forming apparatuses in the network to process the print job.

In order to achieve the above-mentioned object, a method for managing information processing system in the present invention is characterized in that the method for managing an information processing system includes a plurality of external devices connected to a network and a line concentrator that unifies the plurality of external devices and connects the plurality of external devices with another network. In the method for managing an information processing system, (i) data transmitted from another network to the line concentrator is transmitted from the line concentrator to all of the external devices connected to the network, (ii) information transmitted from the external devices to the line concentrator, the information regarding current processing statuses of the external devices, is transmitted from the line concentrator to all of the external devices being connected to the network, and (iii) the external devices select, based upon the data and the information regarding processing statuses, an external device that is to execute the data processing, and execute the data processing.

In the above method for managing an information processing system, data received from another network is transmitted to all of the external devices connected to the network, and the processing statuses of the respective external devices are shared by the other external devices. Therefore, a plurality of external devices can be efficiently utilized. In addition, a destination to which data that does not have to be transmitted to another network, an external device, or others can be selected, and the data is transmitted only to the selected destination.

In other words, the method for managing an information processing system manages the system in connection with the transmission/reception of data to/from a line concentrator and a plurality of external devices being connected to the line concentrator, the line concentrator playing a role in which all of the external devices connected to the network are unified and are connected to another network.

In the method for managing information processing system, data received from another network is transmitted to all of the external devices in the network.

Because the data received from another network is transmitted in advance to all of the external devices being connected to the line concentrator, there is no need for additionally transmitting the data to an external device when it is selected to execute processing of the data.

Further, information regarding processing status is created in each external device and is transmitted to the line concentrator. All of the external devices are designated as a destination, and the information is transmitted to the designated destination. Therefore, all of the external devices can recognize the processing status of each other.

This allows an external device itself to select an external device most adequate for executing the processing, based upon the category, or other criteria, of the received data and information regarding processing status of the respective external devices, and the selected external device can execute the processing of the data.

This enables execution of the processing of received data by efficiently utilizing a plurality of external devices concurrently with reducing load on the network.

This structure can be applied to an information processing system employing a star-type LAN configuration that uses a twisted cable and includes a switching hub that is becoming common in LANs, as a network connecting the line concentrator and the external device.

In order to achieve the above-mentioned object, a method for managing an information processing system is characterized in that the method for managing an information processing system includes a plurality of external devices connected to a network and a line concentrator that unifies the plurality of external devices and connects the plurality of external devices with another network. In the method for managing an information processing system, (i) when data is transmitted from another network to the line concentrator, the data is transmitted from the line concentrator to all of the external devices connected to the network, (ii) information regarding current processing statuses of the respective external devices is transmitted from the external devices to the line concentrator, and (iii) the line concentrator selects, based upon the data and the information regarding processing status, an external device that is to execute the data processing, and the selected external device executes the data processing.

In this method for managing an information processing system, data received from another network is transmitted to all of the external devices connected to the network, and processing status of the respective external devices is shared with the other external devices. Therefore, the plurality of external devices can be efficiently utilized. In addition, concerning data that does not have to be transmitted to another network, an external device, or others, a transmission destination is designated, and the data is transmitted only to the designated destination.

In other words, the method for managing an information processing system manages the system in connection with the transmission/reception of data to/from a line concentrator and a plurality of external devices connected to the line concentrator, the line concentrator playing a role in which all of the external devices connected to the network are unified and are connected to another network.

In the method for managing an information processing system, data received from another network is transmitted to all of the external devices in the network.

Because data received from another network is transmitted in advance to all of the external devices connected to the line concentrator, there is no need for additionally transmitting the data to an external device when it is selected to execute processing of the data.

Further, in the external devices, information regarding processing status is created and is transmitted to the line concentrator.

The line concentrator selects an external device that is most adequate for executing the processing of the data based upon at least the category of received data and the information regarding processing status of the respective external devices, and the selected external device can execute the processing.

This enables efficient utilization of a plurality of external devices to execute the processing of received data concurrently while reducing the load on the network.

This structure can be applied to an information processing system using a star-type LAN configuration using a twisted cable and including a switching hub that is becoming common in LANs, as a network for connecting the line concentrator and the external device(s).

It is preferable that selection of the external device that is to execute the processing be made in such a way that there is at least one external device either that is in the idle state or that has almost completed the processing for a previous task.

By continuously having an external device available, processing of newly received data can be promptly executed.

For a fuller understanding of the nature and advantages of the invention, reference should be made to the ensuing detailed description taken in conjunction with the accompanying drawings.

BEST MODE FOR CARRYING OUT THE INVENTION

First Embodiment

Figure 1:
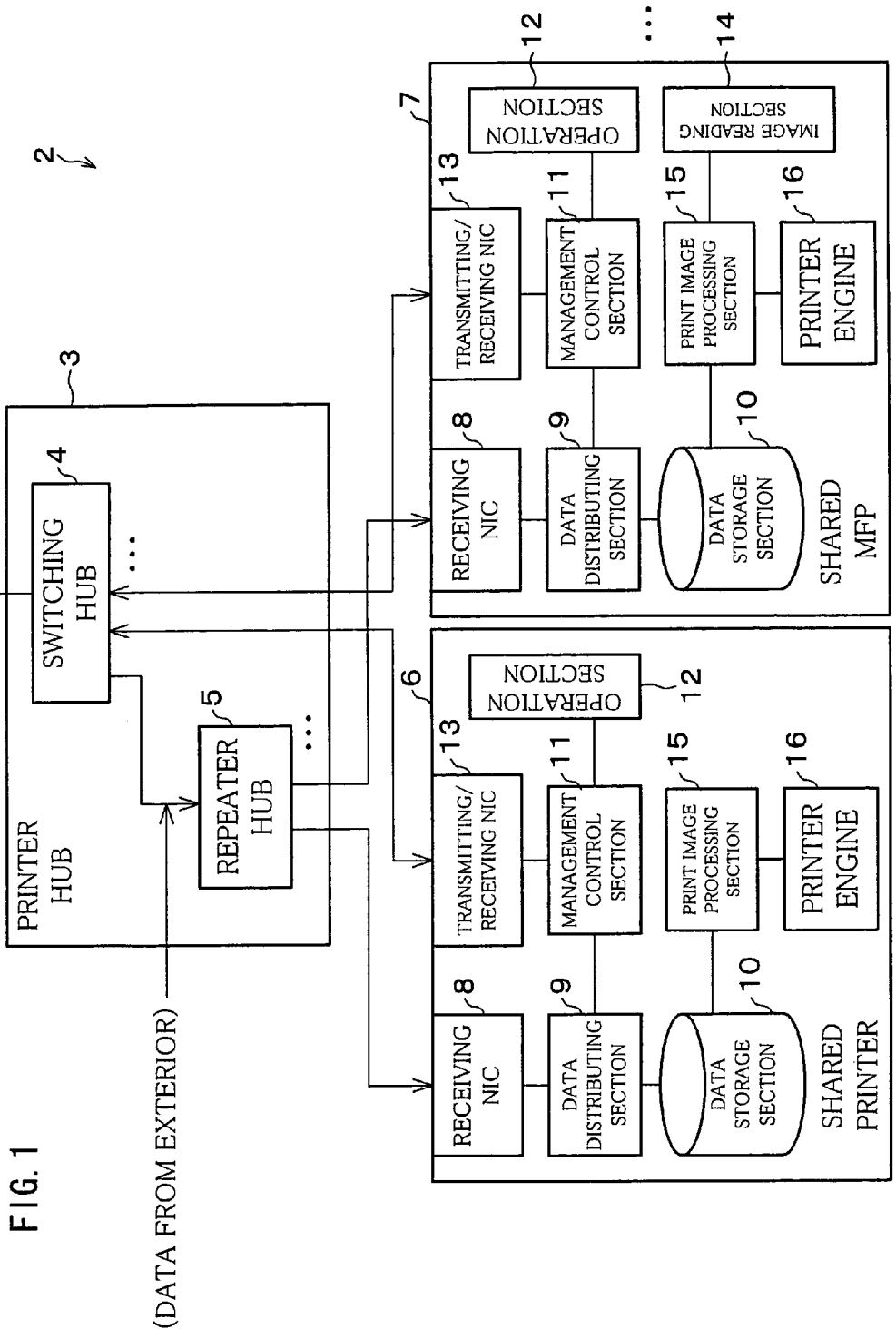
FIG. 1 is a block diagram that schematically illustrates respective structures of a printer hub, a shared printer, and a shared MFP, all of which are parts of a print system in connection with an embodiment of the present invention.
Figure 2:
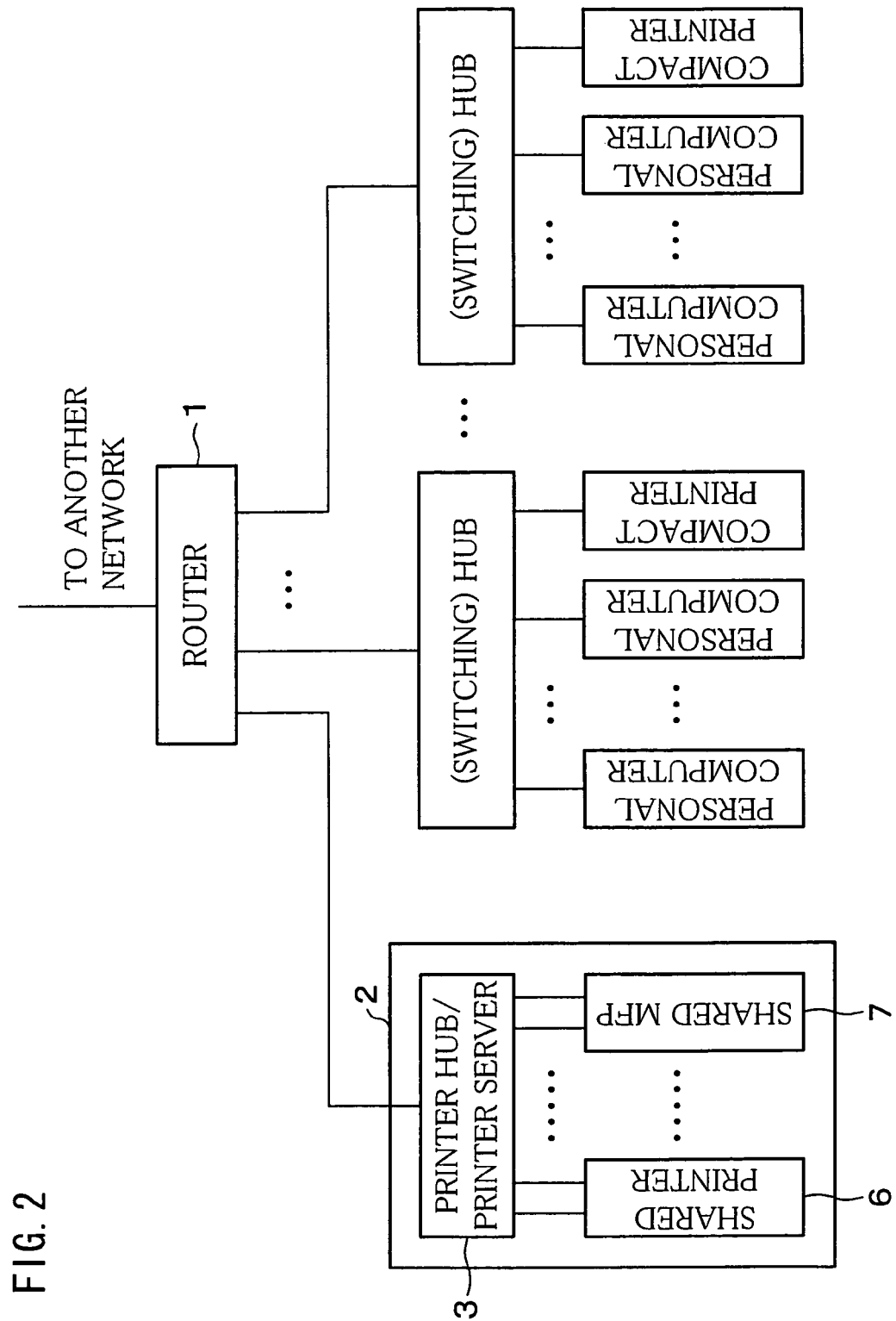
FIG. 2 is a block diagram that illustrates a structure of a star-type LAN configuration to which the print system in FIG. 1 is connected.

The following describes embodiments of a line concentrator, external devices, an information processing system including the line concentrator and the external devices, and a management method of the information processing system, with reference to FIG. 1 and FIG. 2.

A print system (information processing system) 2 of the present embodiment may be connected to another network by a router 1, as illustrated in FIG. 2. The print system adopts a star-type LAN configuration using a twisted cable, and a plurality of print systems 2 are connected to the router 1.

The print system 2 includes a printer hub (line concentrator) 3, a shared printer (external device) 6 connected to the printer hub 3, and a shared MFP (external device) 7, as illustrated in FIG. 1.

The printer hub 3 includes a switching hub (destination selection delivery means) 4 that receives data from another network through the router 1 in FIG. 2 and a repeater hub (received data delivery means) 5 disposed downstream from the switching hub 4.

The switching hub 4 transmits received data only to a designated device among devices being connected. In the print system 2 in the embodiment, the switching hub 4 transmits received data to the repeater hub 5.

The repeater hub 5 transmits data received from the switching hub 4 to all of image forming apparatuses (external devices) included in the print system 2 in the embodiment, namely to the shared printer 6 and the shared MFP (Multi-Function Printer) 7.

This makes it possible, for example, to supply print data transmitted from the outside to all of the image forming apparatuses being connected to the shared printer hub 3 in the print system 2. Also, when the print data is processed in a plurality of image forming apparatuses, it is unnecessary to individually send the print data to the image forming apparatuses. Therefore, among the image forming apparatuses, in the print system 2, having functions required for processing of the print data, an image forming apparatus that is most appropriate for the process can be selected for carrying out the process.

The shared printer 6 includes a receiving NIC (Network Interface Card) (receiving means) 8, a data distributing section 9, a data storage section 10, a management control section 11, an operation section 12, a transmitting/receiving NIC (transmitting/receiving means) 13, a print image processing section 15, and a printer engine 16.

The shared MFP 7 includes a receiving NIC 8, a data distributing section 9, a data storage section 10, a management control section 11, an operation section 12, a transmitting/receiving NIC 13, an image reading section 14, a print image processing section 15, and a printer engine 16.

As the foregoing describes, each of the shared printer 6 and the shared MFP 7 includes a transmitting/receiving NIC 13 that is a network interface for normal transmitting/receiving and a receiving NIC 8 that is a network interface for receiving-only.

Each of the shared printer 6 and the shared MFP 7 transmits/receives data to/from the printer hub 3 by using the receiving NIC 8 for receiving-only and the NIC 13 for transmitting/receiving.

In other words, data that is transmitted from another network to all of the image forming apparatuses included in the print system 2 is transmitted from the repeater hub 5 to the receiving NIC 8. On the other hand, information regarding processing status of the data is transmitted from the switching hub 4 to the transmitting/receiving NIC 13 included in another image forming apparatus.

This allows the image forming apparatuses to share the same data and to recognize the status of other image forming apparatuses. Therefore, an image forming apparatus can select the most adequate image forming apparatus among a plurality of image forming apparatuses included in the print system 2, and the selected image forming apparatus can carry out the data processing. Further, for example, when a plurality of image forming apparatuses are selected for carrying out the process, distributed processing of the data can be carried out in the image forming apparatuses by dividing data and transmitting the divided data to the selected image forming apparatuses. Consequently, the plurality of image forming apparatuses included in the print system 2 can be efficiently utilized.

Data outputted from the repeater hub 5 is inputted to the respective receiving NICs 8 of the shared printer 6 and the shared MFP 7. Subsequently, the data transmitted to the data distributing section 9 is separated, in the data distributing section 9, into print data and types of data such as status data. The print data is transmitted to the data storage section 10, and the other types of data are transmitted to the management control section 11.

The management control section 11 manages information regarding the processing status of the device to which the section 11 belongs and outputs the information to the switching hub 4 of the printer hub 3 through the transmitting/receiving NIC 13. In addition, the management control section 11 receives information, which is outputted from another image forming apparatus and which relates to a processing status, through the switching hub 4 and the transmitting/receiving NIC 13. Then, the management control section 11 properly manages performance of print job depending upon the processing status of said other image forming apparatuses.

As the foregoing describes, because processing statuses of other image forming apparatuses can be recognized in each of the image forming apparatuses included in the print system 2, the processing statuses of all of the image forming apparatuses are manageable. Therefore, the image forming apparatuses in the print system 2 can be efficiently utilized by determining which image forming apparatus processes received print data, after recognizing the processing statuses in the respective image forming apparatuses.

The shared printer 6 or the shared MFP 7 that receives a command for carrying out the print job drives the print image processing section 15 and the printer engine 16 and carries out processing of: data stored in the data storage section 10 in the shared printer 6, data stored in the data storage section 10 in the shared MFP 7, or data read by the image reading section 14.

The switching hub 4, as a destination selection delivery means, controls, depending upon the type of the data, whether the data outputted from the transmitting/receiving NIC 13 is to be outputted to the respective image forming apparatuses or to the external network.

For example, when the data outputted from the transmitting/receiving NIC 13 is image data obtained by the image reading section 14 included in the shared MFP 7, in the switching hub 4, an image forming apparatus for processing the image data is selected, and the image data is transmitted to the selected image forming apparatus. Therefore, with respect to data that does not have to be transmitted to all of the image forming apparatuses or to the external network, or important data that must not be transmitted to the outside, a destination of the data can be designated in the switching hub 4, and the data is transmitted to the designated destination. Thus, it is possible to establish a print system 2 having a security function that ensures security of an image forming apparatus other than a designated image forming apparatus in the external network or in the print system 2.

In the print system 2, in the embodiment described above, even if the print system 2 is connected to a star-type LAN configuration, by making the respective image forming apparatuses uniformly receive one print data and exchange the processing statuses with the other image forming apparatuses, the respective image forming apparatuses can be adjusted depending upon the processing status of all of the image forming apparatuses so that processing can be efficiently carried out.

Second Embodiment

Figure 3:
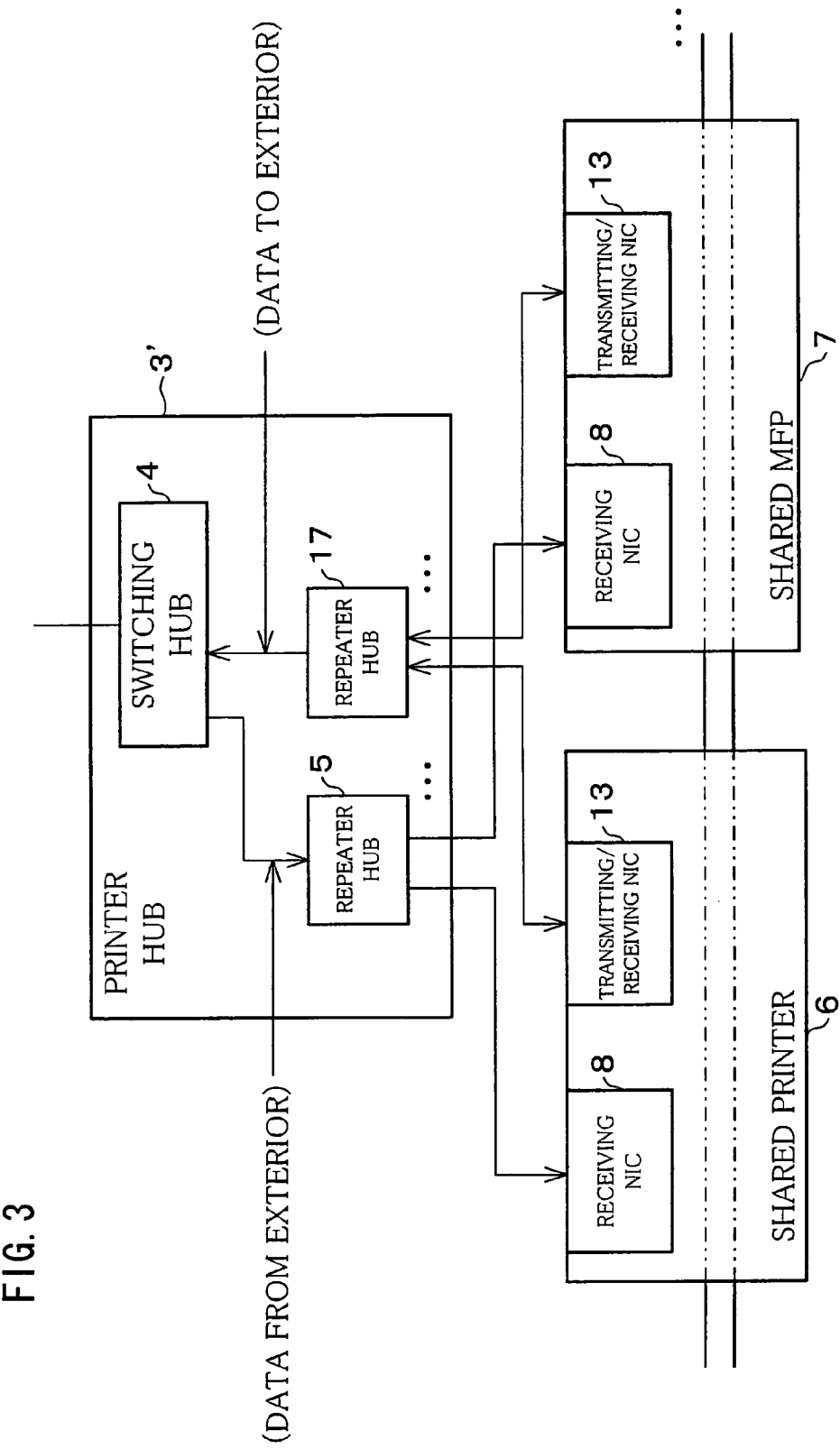
FIG. 3 is a block diagram that schematically illustrates respective structures of a printer hub and image forming apparatuses, all of which are in connection with a second embodiment of the present invention.

The following describes second embodiments of a line concentrator, an external device, an information processing system including the line concentrator and the external device, and a management method of the information processing system, with reference to FIG. 3.

For convenience, with regard to components having the same functions as those in the figure described in the First Embodiment, the same reference numbers are used, and description thereof is omitted.

A print system in the embodiment, like the print system 2 in the First Embodiment, carries out a print process for received data. The print system in the embodiment, however, is different from the print system in the First Embodiment in that the printer hub (line concentrator) 3' further includes a repeater hub (second received data delivery means) 17 in addition to the switching hub 4 and the repeater hub (received data delivery means, the first received data delivery means) 5, as illustrated in FIG. 3.

Accordingly, information, such as print processing status between the shared printer 6 and the shared MFP 7 or an image obtained by the scanner section of the shared MFP 7, is transmitted/received by the repeater hub 17, instead of the switching hub 4, to/from the respective image forming apparatuses (shared printer 6, shared MFP 7).

This makes it possible to transmit information regarding the processing status of the respective image forming apparatuses from the repeater hub 17 to all of the image forming apparatuses and the switching hub 4. Therefore, the processing status of the other image forming apparatuses can be recognized in each respective image forming apparatus, and received data can be processed by an image forming apparatus that is the most adequate for processing the data. Further, because each of the image forming apparatuses are connected to another network through the switching hub 4, transmission of important information to the other network can be prevented.

As described above, in the print system of the present embodiment, because the printer hub 3' includes the repeater hub 17, data can be transmitted at once to all of the image forming apparatuses in the network in addition to the effect obtained in the First Embodiment. Therefore, compared to the printer hub 3 in the First Embodiment, data can be transmitted to the respective image forming apparatuses more efficiently.

In the above description, transmission between the repeater hub 5 and the receiving NIC 8 and transmission between the repeater hub 17 and the transmitting/receiving NIC 13 are presented as examples of transmissions between the printer hub 3' and the respective image forming apparatuses. Alternatively, radio transmission means, such as UWB, can be employed.

Further, because the repeater hub 17 transmits received data to all of its ports, data to be transmitted to another network via the switching hub 4 is selected based upon an address or the like.

Third Embodiment

Figure 4:
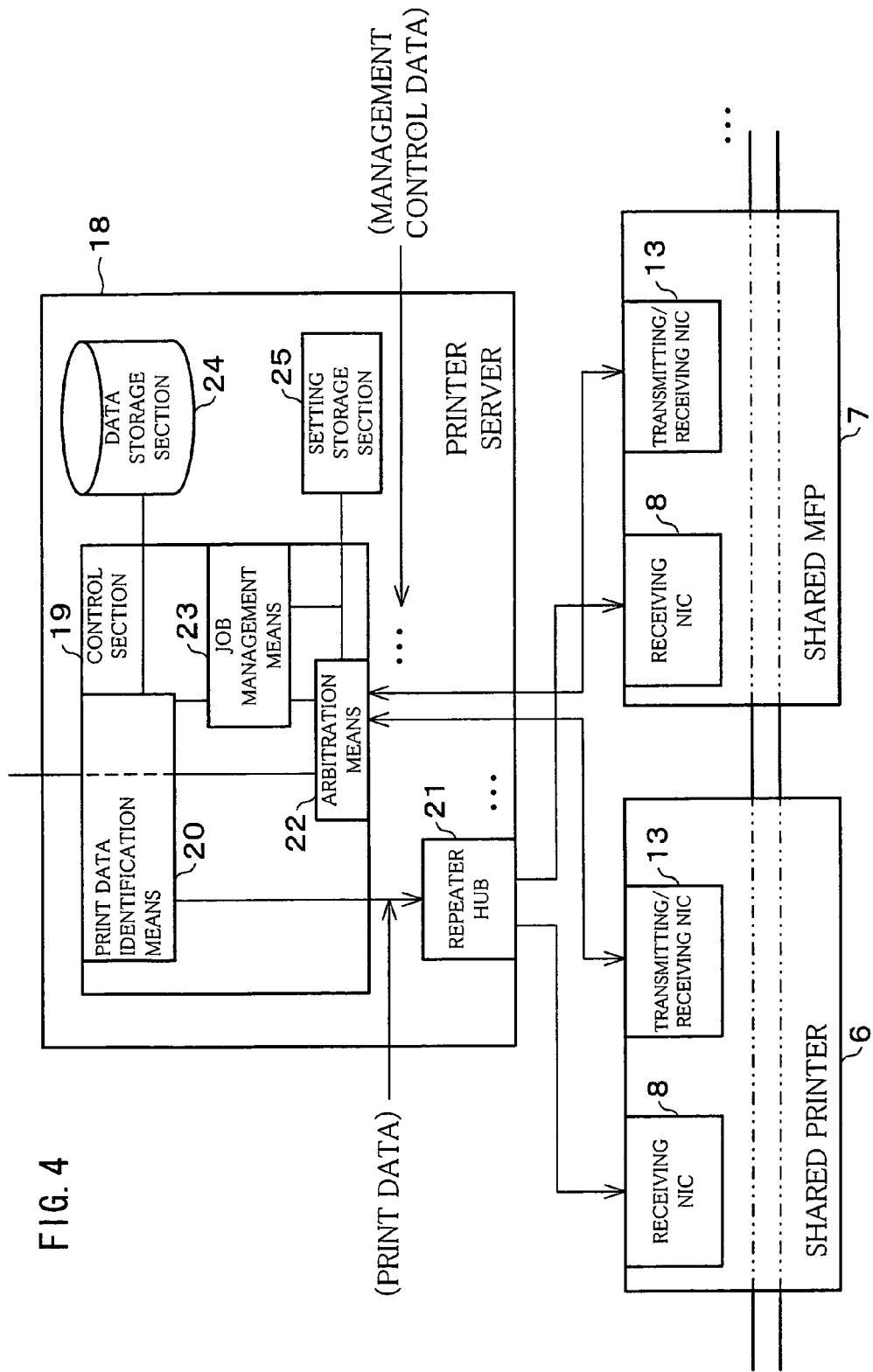
FIG. 4 is a block diagram that schematically illustrates respective structures of a printer hub and image forming apparatuses, all of which are in connection with a third embodiment of the present invention.

The following describes third embodiments of a line concentrator, an external device, an information processing system including the line concentrator and the external device, and a management method of the information processing system, with reference to FIG. 4.

For convenience, with regard to components having the same functions as those in the figures described in the First Embodiment and in the Second Embodiment, the same reference numbers are used, and description thereof is omitted.

A print system in the embodiment is different from the ones in the First Embodiment and in the Second Embodiment in that a printer server (line concentrator) 18 is included in place of the printer hub 3 or the printer hub 3', as illustrated in FIG. 4. The rest of the components are the same as the ones in the First Embodiment and in the Second Embodiment.

In the respective print systems in the First Embodiment and in the Second Embodiment, the image forming apparatuses (e.g., the shared printer 6, the shared MFP 7) exchange information regarding their processing statuses so as to manage an image forming apparatus that is to carry out a print job.

In the present embodiment, however, a printer server 18 manages the processing status and instructs each image forming apparatus to carry out processing. In addition, content of received data is categorized as either print data or other types of data, and the print data is transmitted to all of the image forming apparatuses.

The printer server 18 includes a control section 19, a repeater hub (received data delivery means) 21, a data storage section 24, and a setting storage section 25.

The control section 19 includes a print data identification means (identification means) 20, an arbitration means 22, and a job management means 23.

The print data identification means 20 receives data from the outside (i.e., the external network) and recognizes the type of the content of the data. Only print data among the data identified by the print data identification means 20 is transmitted through the repeater hub 21 to the receiving NICs 8 of all of the image forming apparatuses. On the other hand, with regard to data other than the print data, such as control data or status data, if the data includes something peculiar to an image forming apparatus, such as an address, an arbitration means 22 transmits the data only to the image forming apparatus corresponding to the peculiarity such as an address.

Further, information regarding the processing status of each image forming apparatus is transmitted from the transmitting/receiving NIC 13 of the image forming apparatus to the control section 19 of the printer server 18.

The arbitration means 22, for example, functions similarly to the switching hub. Based upon information managed by the job management means 23, such as the processing status of each respective image forming apparatus, the arbitration means 22 selects an image forming apparatus that is to execute the print process of the respective print data, and transmits management control data that commands an execution of the process to the selected image forming apparatus.

The job management means 23 recognizes the total amount of received print data by analyzing data supplied from another network, and manages: information regarding the processing status supplied from each respective image forming apparatus; the amount of unexecuted print data; content of data such as monochrome or color; and functions and performances of the image forming apparatuses.

The data storage section 24 temporarily stores received data in order to identify the data in the print data identification means 20.

The setting storage section 25 stores the settings such as functions (e.g. color-printability) and performances of the respective image forming apparatuses. The arbitration means 22 selects an image forming apparatus to which processing of the data is to be requested.

As described above, in the printer server 18, the print system in the embodiment manages the processing statuses of all of the image forming apparatuses being connected. Therefore, the respective image forming apparatuses need to transmit their own processing statuses only to the printer server 18. Unlike in the First Embodiment and in the Second Embodiment, the image forming apparatuses do not have to mutually adjust the print processing. In other words, because the printer server 18 determines to which image forming apparatus print job is assigned, the image forming apparatuses do not need to mutually inform the other image forming apparatuses of their own processing statuses. Therefore, the image forming apparatuses are less burdened, and the print processing can be more efficiently done.

Figure 7:
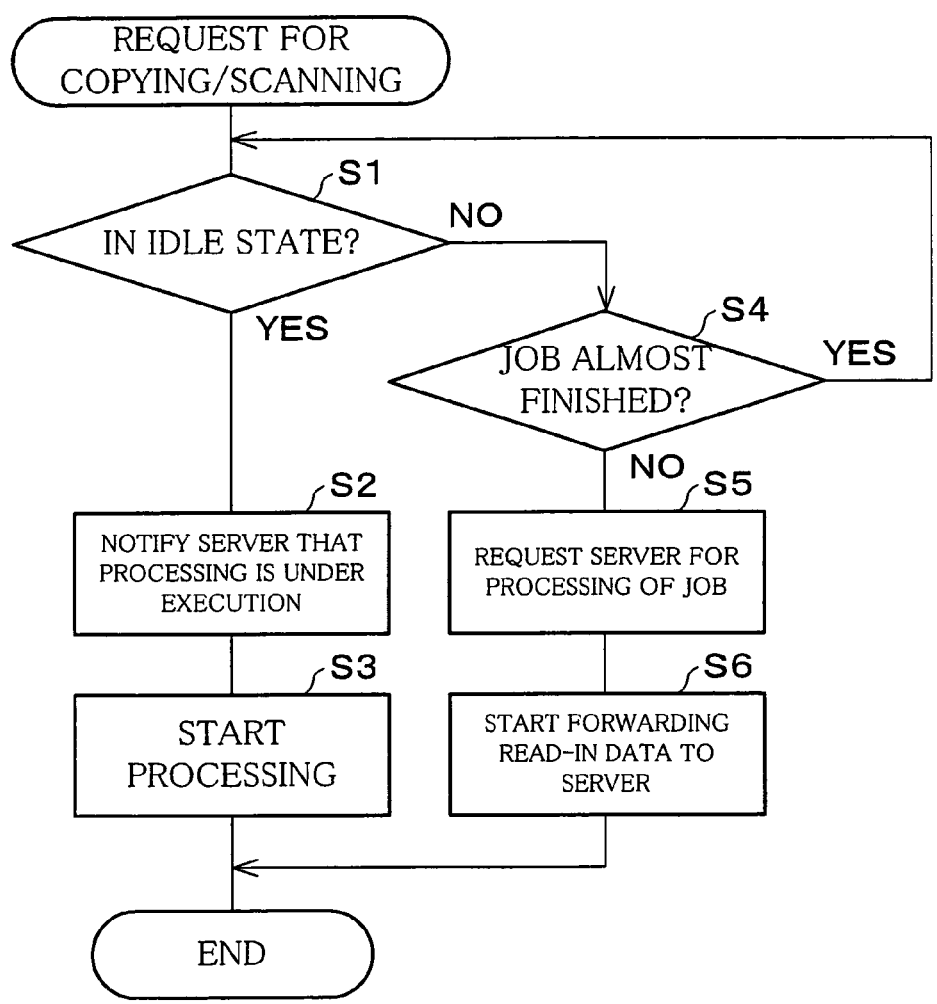
FIG. 7 is a flow chart that shows a process in an image forming apparatus included in a print system in connection with an embodiment of the present invention.
Figure 8:
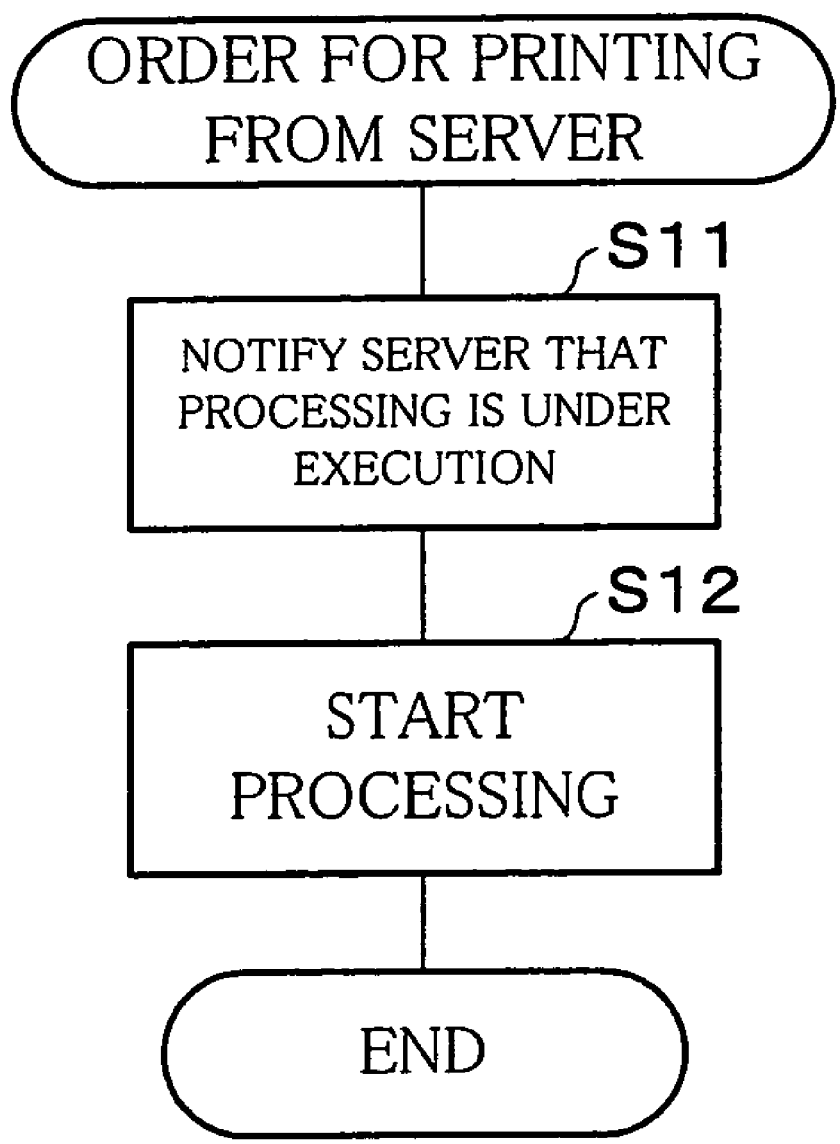
FIG. 8 is a flow chart that shows a process in an image forming apparatus included in a print system in connection with an embodiment of the present invention.
Figure 9:
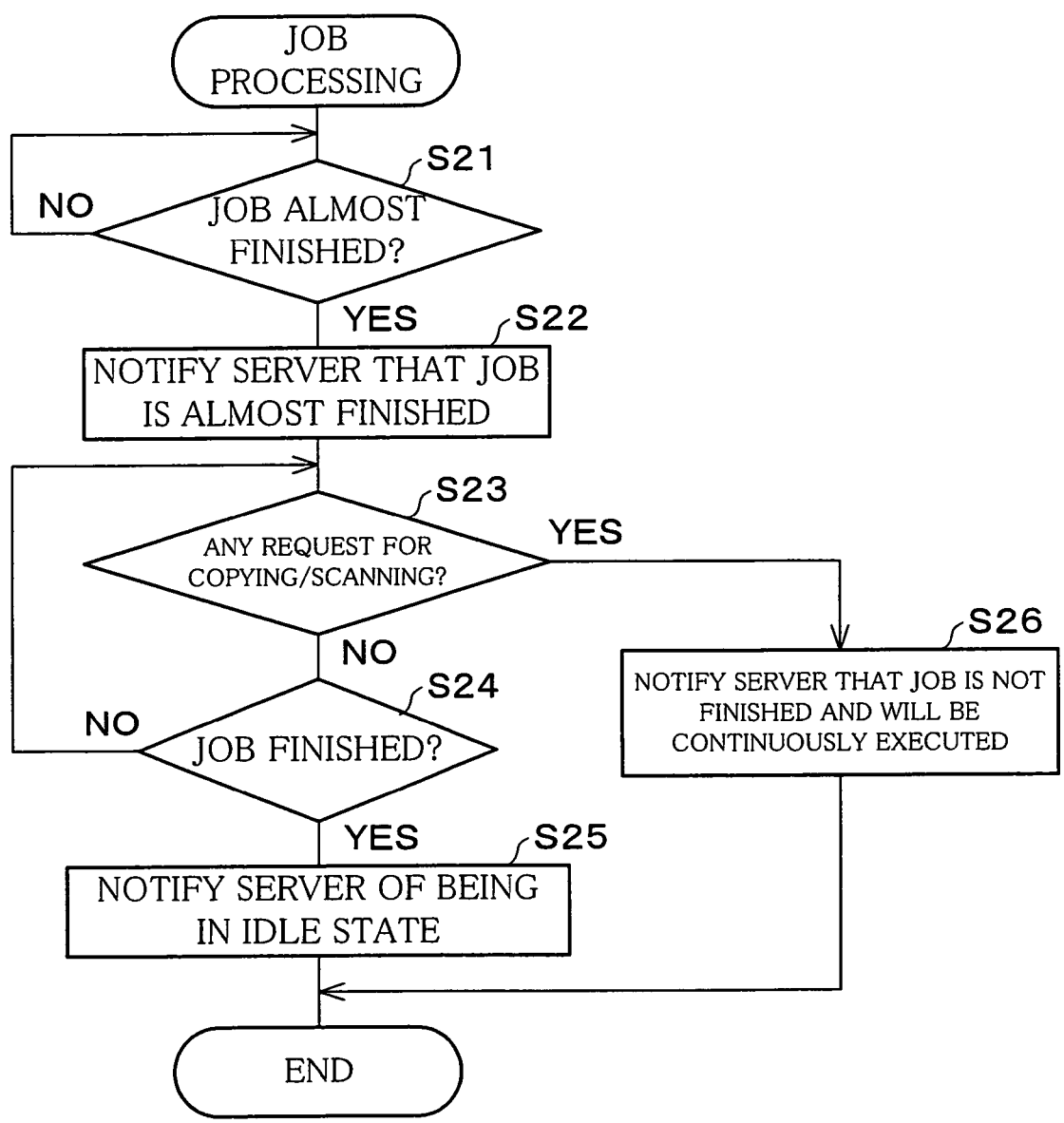
FIG. 9 is a flow chart that shows a process in an image forming apparatus included in a print system in connection with an embodiment of the present invention.

The following describes data processing by an image forming apparatus in the print system in the embodiment, with reference to flow charts illustrated in FIG. 7, FIG. 8, and FIG. 9.

First of all, when the image forming apparatus is the shared MFP 7, the processing is executed in accordance with the flow chart illustrated in FIG. 7.

The shared MFP 7 can perform copying or scanning as well as printing of print data. Therefore, in step S1, when copying or scanning is requested, the shared MFP 7 confirms whether it is in the idle state.

In step 2, if it is confirmed that the shared MFP 7 is in the idle state, the shared MFP 7 notifies the printer server 18 of execution of the process and, in step S3, the shared MFP 7 starts copying or scanning the read-in documents.

On the other hand, if it is confirmed that the shared MFP 7 is not in the idle state, the shared MFP 7 confirms in step S4 whether or not the job executed is almost finished. If it is confirmed that the job is almost finished, the processing goes back to step S1. If it is confirmed that the job will not be finished soon, in step S5, the shared MFP 7 requests the printer server 18 to execute the job of copying or scanning in another image forming apparatus, and in step S6, the shared MFP 7 transfers the read-in data to the printer server 18.

As described above, if the shared MFP 7 is executing a process, the shared MFP 7 transmits data to the printer server 18 so that another image forming apparatus executes the processing of the data. This makes it possible to efficiently execute the processing of the data by fully utilizing all of the image forming apparatuses that are connected to the printer server 18.

In the case in which the image forming apparatus is the shared printer 6, the processing is executed in accordance with the flow-chart illustrated in FIG. 8.

When receiving a print order from the printer server 18, in step S11, the shared printer 6 notifies the printer server 18 that processing is being executed, and in step S12, the shared printer 6 starts printing in accordance with the print order.

Then, after the print job is started, the shared printer 6 or the shared MFP 7 executes the processing in accordance with the flow chart illustrated in FIG. 9.

In step S21, it is monitored whether or not the print job is almost finished. When the job is nearly finished, in step S22, the printer server 18 is notified of the near-finish of the job. In step S23, it is confirmed whether or not copying or scanning has been requested before the print job is finished. If copying or scanning has been requested before the print job is finished, in step S26, the notification that the job is nearly finished is withdrawn, and another notification of continuous execution of the processing is given to the printer server 18. If no request is made on copying or scanning between step S22 and the end of the job, the job is completed in step S24, and in step S25, a notification of the idle state is given to the printer server 18.

Figure 10:
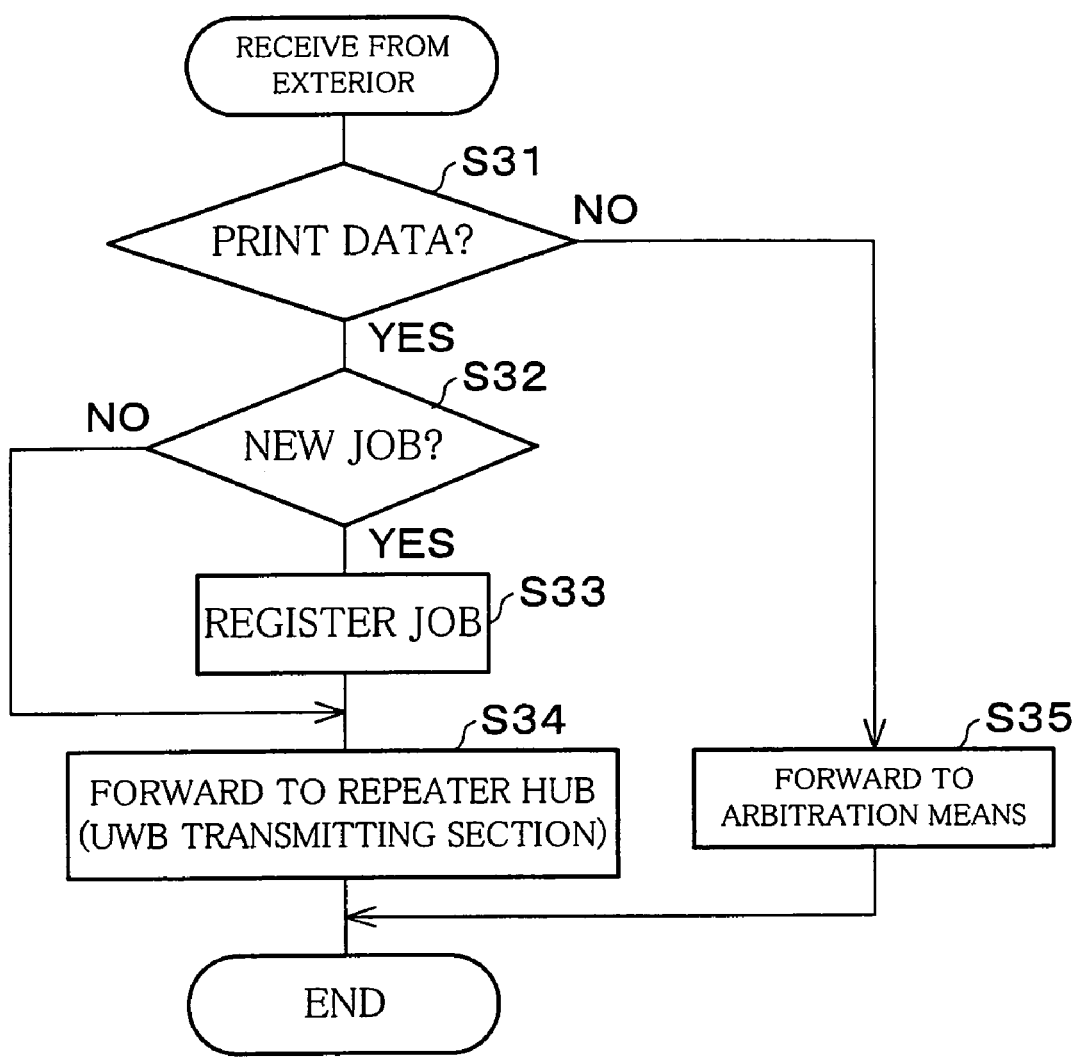
FIG. 10 is a flow chart that shows a process in a printer server included in a print system in connection with an embodiment of the present invention.
Figure 11:
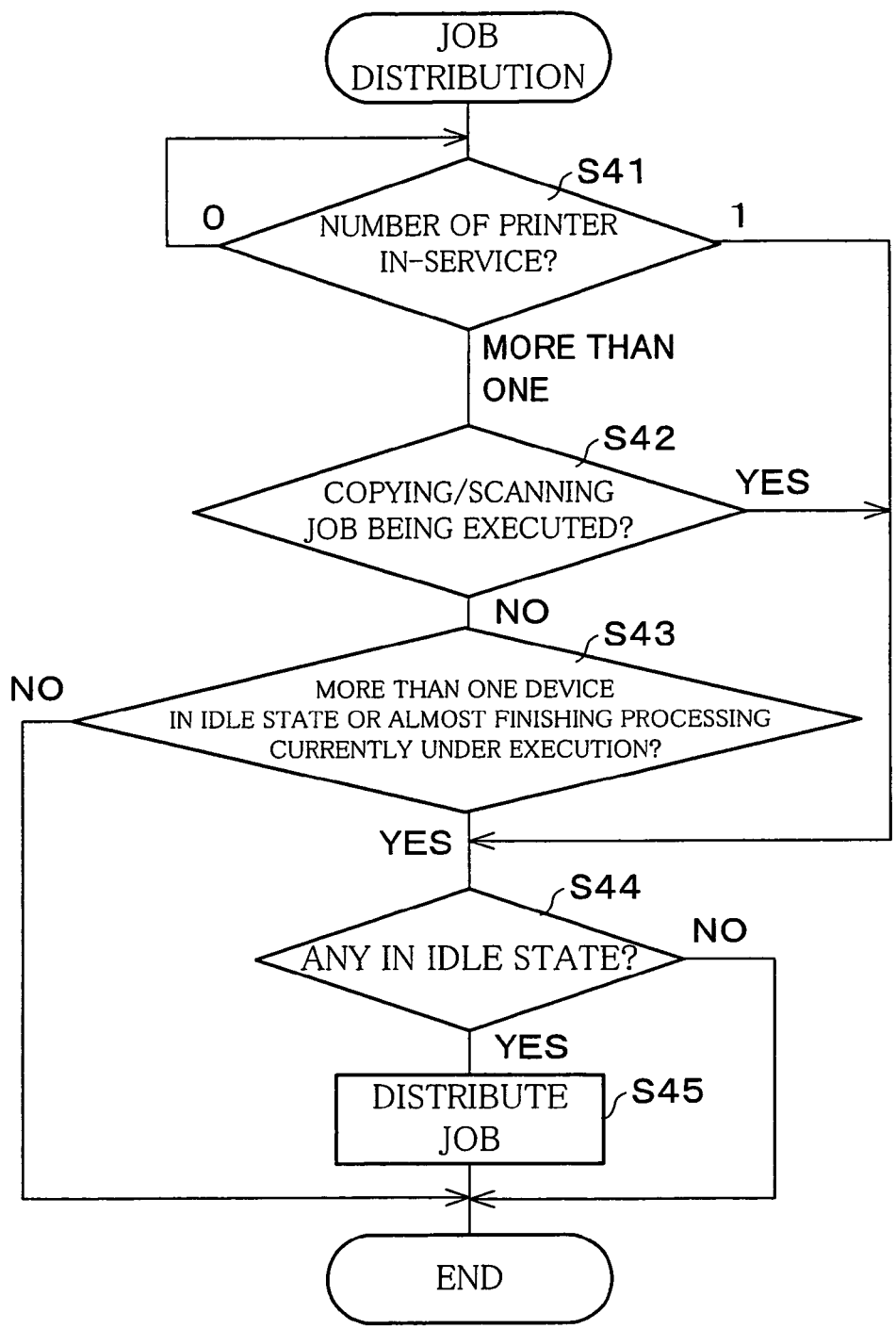
FIG. 11 is a flow chart that shows a process in a printer server included in a print system in connection with an embodiment of the present invention.

The processing in the printer server 18 is executed in accordance with the flow charts illustrated in FIG. 10 and in FIG. 11.

The printer server 18, in step S31, examines whether or not data received from the outside (e.g., external network) is print data, as illustrated in FIG. 10. If the data is print data, it is examined in step S32 to determine whether the print data is continuation print data of the previously received job or data of a new job. If the data is for a new job, the job is registered in step S33 so that the job management means 23 recognizes it as a new job. After the job is registered as a new job or when the job is confirmed as not-a-new-job in step S14, the print data is transferred in step S34 to the repeater hub 21.

The new job registration is carried out to determine the most adequate image forming apparatus for processing each job. When a received processing job order is the same as the registered job, a request for execution of the received processing job can be sent to the corresponding image forming apparatus. Specifically, conditions are registered, such as that print data is in color, or an image forming apparatus including a finisher is needed because sorting is necessary. In addition, depending upon the size of the print data, the job is divided and then registered. As setting for job distribution is changed, setting of these conditions is decided.

If the data is recognized in step S31 as data other than print data, the data is transferred to the arbitration means 22 in step S35. Based upon information such as an address of the received data, the arbitration means 22 transfers the data to the corresponding destination.

The printer server 18 distributes jobs in accordance with the flow chart illustrated in FIG. 11.

In step S41, the number of image forming apparatuses in-service is counted so that image forming apparatuses available for execution of processing are recognized. At this time, if only one device is in service, in step S44, the image forming apparatus is checked to learn if it is in the idle state.

If the image forming apparatus is in the idle state, step S45, the printer server 18 distributes a job. If the image forming apparatus is not in the idle state, the printer server 18 ends the job distribution processing.

If it is confirmed in step S41 that the number of image forming apparatuses in service is more than one, the printer server 18 checks whether or not these image forming apparatuses are executing the copying or scanning jobs. If the image forming apparatuses are executing copying or scanning jobs, because the situation should be promptly taken care of, the printer server 18 in step S44 searches and selects another image forming apparatus that is in the idle state, and in step S45, the printer server 18 allocates the job to the selected image forming apparatus.

If it is confirmed in step S42 that the image forming apparatus is not executing a copying or scanning job, it is determined in step S43 whether there are a plurality of image forming apparatuses either that are in the idle state or that are almost finishing processing. If there is an image forming apparatus either that is in the idle state or that is almost finishing processing, the printer server 18 in steps S44 and S45 allocates a job to the image forming apparatus either that is in the idle state or that is finishing processing. On the other hand, if there is no image forming apparatus in the idle state or that is almost finishing processing, the printer server 18 ends the job distribution processing.

It is preferable that the allocation of a job in step S45 be conducted in such a way that at least one image forming apparatus is reserved that is either in the idle state or almost finishing processing.

This makes it possible to always reserve an image forming apparatus that is available when copying or scanning is requested.

Fourth Embodiment

Figure 5:
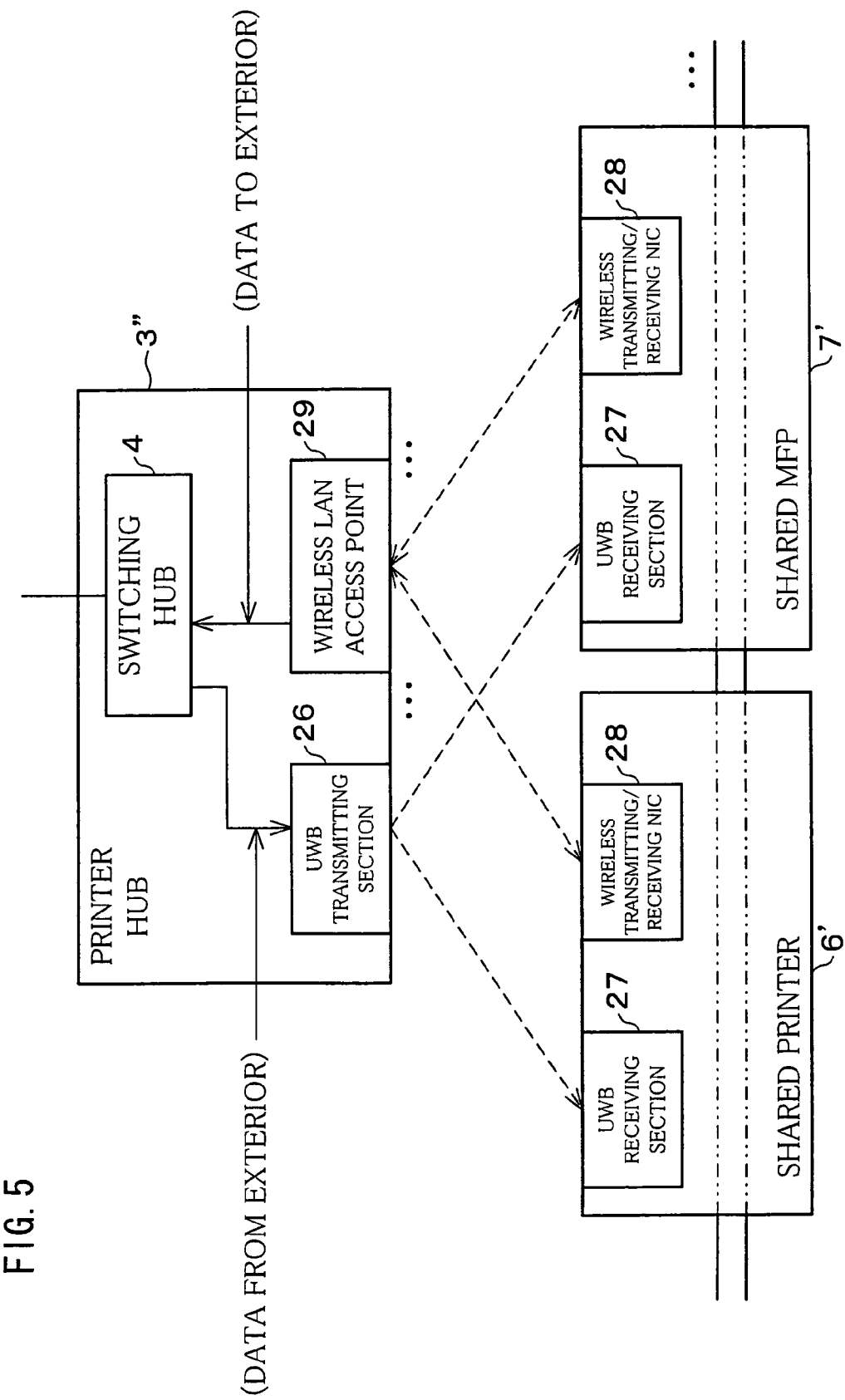
FIG. 5 is a block diagram that schematically illustrates respective structures of a printer hub and image forming apparatuses, all of which are in connection with a fourth embodiment of the present invention.

The following describes fourth embodiments of a line concentrator and an external device of the present invention, an information processing system including the line concentrator and the external device, and a management method of the information processing system, with reference to FIG. 5.

For convenience, with regard to components having the same functions as those in the figure described in the First Embodiment, in the Second Embodiment, and in the Third Embodiment, the same reference numbers are used, and description thereof is omitted.

The print system in the embodiment is different from the ones in the First, Second, and Third Embodiments in that data is transmitted/received between the printer hub 3 and the image forming apparatuses (e.g., the shared printer 6', the shared MFP 7') wirelessly instead of using a cable. The print system includes, as a communication means, a UWB transmission section (received data delivery means) 26, a UWB receiving section 27, a wireless LAN access point (destination selection delivery means) 29, and a wireless transmitting/receiving NIC (transmitting/receiving means) 28, as illustrated in FIG. 5. The rest of the components are the same as the ones in the First, Second, and Third Embodiments.

The process in the printer hub 3 and in the respective image forming apparatuses is carried out in the same way as in the First Embodiment.

The printer hub 3" includes the switching hub 4, the UWB transmission section 26, and the wireless LAN access point 29.

Each of the shared printer 6' and the shared MFP 7' includes a receive-only UWB receiving section 27 that receives data from the UWB transmission section 26 in the printer hub 3", and the wireless transmitting/receiving NIC 28 that can transmit/receive data to/from the wireless LAN access point 29.

Print data received from another (e.g., external) network is transmitted from the UWB transmission section 26 in the printer hub 3" to the UWB receiving sections 27 of the respective image forming apparatuses through the switching hub 4.

On the other hand, information regarding the print processing status of each image forming apparatus is transmitted from the wireless transmitting/receiving NIC 28 in the image forming apparatus to the wireless LAN access point 29 in the printer hub 3". Then, the information is transmitted from the wireless LAN access point 29 to the transmitting/receiving NIC 28 in another image forming apparatus.

This makes it possible to efficiently utilize the plurality of image forming apparatuses included in the print system, likewise the print systems in the First Embodiment, in the Second Embodiment, and in the Third Embodiment.

Further, because data is transmitted/received wirelessly instead of using a cable, flexibility can be improved in layout of the printer hub 3 and the plurality of image forming apparatuses being connected therewith.

Further, because a UWB has an advantage of high transmission speed in short-distance data transmission/reception, the UWB is effective in a print system in which image forming apparatuses are disposed at a relatively short distance from a hub, approximately ten meters. On the other hand, the UWB has a characteristic in which throughput rapidly decreases as transmission distance increases. In addition, because carrier wave is not used, energy may be concentrated in a narrow bandwidth. Consequently, buried in noise, communication cannot be easily detected. Therefore, data leakage due to interception of the communication in the air can be prevented, and a print system having enhanced security function can be established.

Fifth Embodiment

Figure 6:
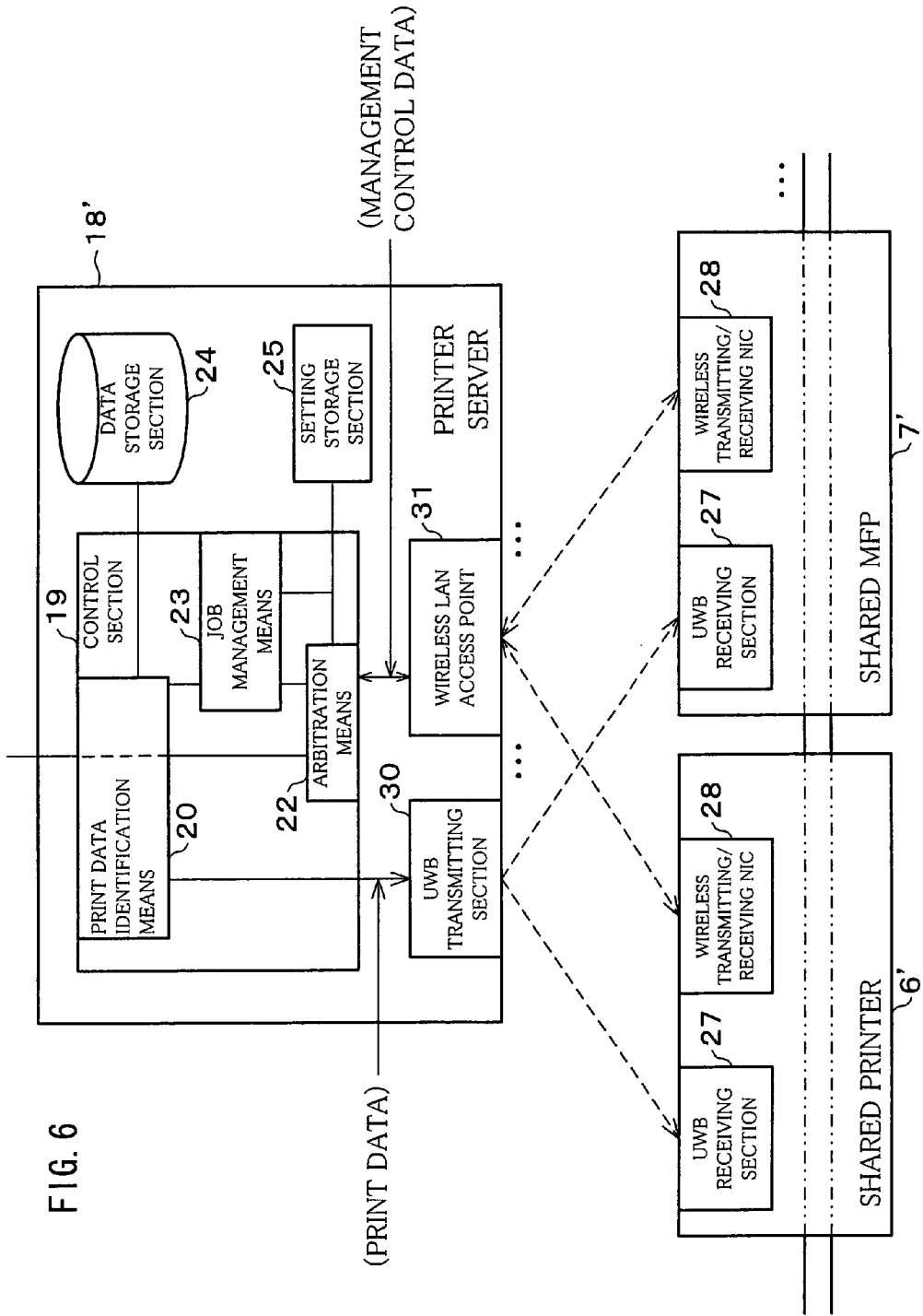
FIG. 6 is a block diagram that schematically illustrates respective structures of a printer server and image forming apparatuses, all of which are in connection with a fifth embodiment of the present invention.

The following describes fifth embodiments of a line concentrator and an external device of the present invention, an information processing system including the line concentrator and the external device, and a management method of the information processing system, with reference to FIG. 6.

For convenience, with regard to components having the same functions as those in the figure described in the First, Second, Third, and Fourth Embodiments, the same reference numbers are used, and description thereof is omitted.

The print system in the present embodiment, as in the Fourth Embodiment, is different from the print system in the Third Embodiment in that data is transmitted/received to/from the printer server 18' and the respective image forming apparatuses (shared printer 6' and the shared MFP 7') wirelessly instead of through a cable, as illustrated in FIG. 6. The rest of the components remain the same.

The printer server 18' in the embodiment includes a UWB transmission section (received data delivery means) 30 and a wireless LAN access point (destination selection delivery means) 31 in addition to a control section 19, a data storage section 24, and a setting storage section 25.

Each of the image forming apparatuses includes a UWB receiving section 27 and a wireless transmitting/receiving NIC 28.

Print data supplied from another (i.e., external) network is transmitted from the UWB transmission section 26 in the printer server 18' to the UWB receiving sections 27 in all of the image forming apparatuses connected. Further, information regarding the print processing status of each image forming apparatus is transmitted from the wireless transmitting/receiving NIC 28 in the image forming apparatus to the wireless LAN access point 29 in the printer server 18'. Then, the wireless LAN access point 29 transmits the information regarding the print processing status to the wireless transmitting/receiving NIC 28.

This makes it possible to efficiently utilize the plurality of image forming apparatuses included in the print system, similar to the print systems in the First, Second, Third, and Fourth Embodiments.

Further, in the print system of the present embodiment, as in the Fourth Embodiment, a cable is not used for transmitting/receiving data; hence, flexibility in layout of the printer server 18 and the image forming apparatuses can be increased. In addition, as in the Fourth Embodiment, because a UWB has an advantage of high transmission speed in short-distance data transmission/reception, the UWB is effective in a print system in which image forming apparatuses are disposed at a relatively short distance from the hub.

Further, in the print system in the embodiment, as in the Third Embodiment, the processing in an image forming apparatus is executed in accordance with the flow charts illustrated in FIG. 7, in FIG. 8, and in FIG. 9. The processing in the printer server 18 is executed in accordance with the flow charts illustrated in FIG. 10 and in FIG. 11.

Further, in the shared printer 6', in the shared MFP 7', and in the printer server 18', the processing is otherwise executed in the same way as in the Third Embodiment. In other words, except that a wireless communication means is adopted, the embodiment is the same as the Third Embodiment. Therefore, in the present embodiment, the same effect can be obtained as that in the Third Embodiment, and additional effect can be obtained by using a wireless communication.

The First to Fifth Embodiments described above provide, as examples of external devices, image forming apparatuses, such as the shared printer 6 and the shared MFP 7, but the present invention is not to be limited to these embodiments. For example, in an information processing system in which a plurality of devices are connected to a common hub, and their processing is managed, a device other than an image forming apparatus can be used as an external device.

Further, the First to Fifth Embodiments described above provide an example in which there are two external devices (the shared printer 6, the shared MFP 7), but the present invention is not to be limited to these embodiments. For example, it is recognized that the present invention be applied to an information processing system including more than two external devices, because many external devices can be efficiently utilized.

Further, in the First to Third Embodiments, a receive-only network interface is used as a receiving NIC, but the present invention is not to be limited to this arrangement. A network interface that can transmit and receive data, for example, can be used as well.

Following is another way of describing the print system. The print system includes the plurality of image forming apparatuses that can be connected to a network, and a line concentrator that unifies the plurality of image forming apparatuses and connects the unified image forming apparatuses to another network. In the print system, each image forming apparatus includes a receive-only network interface in addition to a normal transmission/reception network interface, and the line concentrator transmits data from the other (i.e., external) network to the receive-only network interfaces in all of the image forming apparatuses.

Further, as described above, the line concentrator may include or constitute a hub having a plurality of connection counterparts. Connection to targets can be done through wiring or, for example, wirelessly. The line concentrator includes a plurality of connection counterparts, and outputs data inputted from one connection counterpart to at least one other connection counterpart.

In the line concentrator, at least one of the connection counterparts is a connection counterpart for input to the line concentrator, and a plurality of connection counterparts other than the connection counterpart(s) for the input are for output. The line concentrator includes: a data delivery means that outputs data inputted from the inputting connection counterpart to all of the outputting connection counterparts; and a processing status delivery means that, when information regarding the processing status of itself is supplied from one of the outputting connection counterparts, outputs the information to all of the outputting communication counterparts. The data delivery means and the processing status delivery means of the line concentrator are connected to the same outputting connection counterpart.

When data is inputted from an inputting connection counterpart to the line concentrator having the above structure, through the data delivery means, the data is outputted to all of the outputting connection counterparts. The data is processed in one of the outputting connection counterparts, and the processing status is outputted to the line concentrator. The processing status of the outputting connection counterpart is outputted to all of the outputting connection counterparts by the processing status delivery means of the line concentrator.

Because the data is outputted to all of the outputting connection counterparts in advance, delay in processing or increase of traffic due to re-transmission of data to a substitute device do not occur. In addition, delay in processing or increase of traffic due to re-transmission of data after temporarily storing the data in the printer server does not occur. In other words, if the same data is forwarded and re-transmitted like in the conventional way, not only is processing delayed, but also traffic naturally increases because communication path and communication slot are used multiple times for the same data.

Further, because data inputted from an inputting connection counterpart is outputted to all of outputting connection counterparts, and the outputting connection counterparts mutually notify each other of their processing statuses, an efficient data processing can be easily achieved. For example, the outputting connection counterparts distribute processing of data and execute the processing.

An information processing system can be established by connecting a plurality of external devices with the line concentrator. The line concentrator can be applied to, for example, an information processing system for exchanging print data for printing. In this case, the inputting connection counterpart can be a computer as a print data creation means that creates print data for printing and inputs the data into the line concentrator. The outputting connection counterpart can be a printer for printing the print data.

To construct the line concentrator, for example in the First Embodiment, a data delivery means and a processing status delivery means may be constructed by using the switching hub 4 and the repeater hub 5. In other words, as illustrated in FIG. 1, the switching hub 4 is connected to the inputting connection counterpart, the switching hub 4 and the repeater hub 5 are connected to each other, and the repeater hub 5 is connected to the outputting connection counterpart so that the data delivery means is constructed. Further, by connecting the repeater hub 5 and the switching hub 4 to the respective outputting communication counterparts, and connecting the repeater hub 5 with the switching hub 4, the processing status delivery means can be constructed.

Further, for example in the Second Embodiment, the data delivery means and the processing status delivery means may be constructed by using the switching hub 4, the repeater hub 5, and the repeater hub 17. In other words, like in FIG. 1, the data delivery means may be constructed by using the switching hub 4 and the repeater hub 5, as illustrated in FIG. 3. The processing status delivery means can be constructed by additionally connecting the repeater hub 17 to the outputting connection counterpart. Likewise in the Second Embodiment, it is useful if the repeater hub 17 and the switching hub 4 are further connected to each other.

A line concentrator is not to be limited to the structures mentioned above. A line concentrator including a data delivery means may include, in substitution for the processing status delivery means, a processing status instructing means that (i) is connected to an outputting connection counterpart, (ii) receives data processing statuses of the respective outputting connection counterparts, which are outputted from the respective outputting connection counterparts, (iii) selects an outputting connection counterpart that is most adequate for processing the data, and (iv) instructs the selected outputting connection counterpart to process the data.

Also in this structure, an efficient data processing can be easily achieved, for example, by carrying out distributed processing of data by distributing the data processing to the output connection counterparts.

Further, by properly setting the processing in the processing status instructing means, data processing can be suitably set. For example, the processing of the connection counterparts can be adjusted in such a way in which at least one of the plurality of connection counterparts is either in the idle state or is almost finishing the processing currently under execution. This makes it possible to reserve an external device available for processing, and therefore when new data is supplied, processing of the data can be promptly executed.

To construct the line concentrator, the arbitration means 22 illustrated in FIG. 4 may be adopted as the processing status instructing means of the line concentrator.

It will be obvious to one of skill in the art that the embodiments thus described may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

In the line concentrator of the present invention, print data is transmitted to all of the image forming apparatuses being connected. This allows the image forming apparatuses to mutually inform the processing statuses prior to assignment of the print data. Therefore, the print data can be efficiently processed. Further, there is no delay in processing or increase of traffic due to re-transmission of print data to a substitute device or due to temporality receiving and re-transmitting data in a print server. Therefore, the line concentrator of the present invention can be applied to an information processing system for efficiently executing process of data.

The invention claimed is:

1. An information processing system comprising:
a plurality of external devices that are connected to a local network; and
a line concentrator apparatus that unifies the plurality of external devices via the local network and connects the unified external devices to an external network,
the line concentrator apparatus comprising:
a switching hub, and
a repeater hub, wherein
said switching hub receives data from said external network and transmits the data to the repeater hub, and transmits information received from a first external device of the plurality of external devices to external devices of the plurality of external devices other than the first external device, the information regarding a processing status of the first external device, and
said repeater hub transmits the data from the switching hub to all of the external devices that are connected to the local network, said repeater hub transmitting the data, as it is, to all of the external devices equally,
each of the external devices comprising:
a receive-only receiving device that receives the data which has been supplied from said external network to the repeater hub of the line concentrator apparatus, and
a transmitting/receiving device that, when the external device is executing processing of data received via the receiving device, transmits information regarding a data processing status to another of the external devices in the local network via the switching hub of the line concentrator apparatus, and that, when any other of the external devices executes processing, receives information regarding a data processing status from said any other external devices via the switching hub, and the plurality of external devices themselves mutually select an external device best suited for processing the data, based on the information regarding the processing statuses of the external devices, wherein the external devices are printing devices.

2. The information processing system as set forth in claim 1, wherein the switching hub of the line concentrator apparatus comprises an identification device that identifies a type of content of data supplied from said external network.

3. The information processing system as set forth in claim 1, wherein the line concentrator apparatus further comprises an arbitration device that selects an external device that is the most adequate for processing of the data, based upon information regarding processing statuses of the respective external devices, the information supplied from all of the external devices that are connected to the local network.

4. The information processing system as set forth in claim 1, wherein the external devices and the line concentrator apparatus are connected through a wireless communication connection.

5. The information processing system as set forth in claim 4, wherein the wireless communication connection used for transmitting data from the line concentrator apparatus to all of the external devices in the local network is UWB.

6. The information processing system as set forth in claim 1, wherein at least one of the external devices is an image forming apparatus.

7. The information processing system as set forth in claim 1, wherein the switching hub of the line concentrator apparatus transmits to the external network the information received from the first external device regarding a processing status of the first external device.

8. An information processing system comprising:
   a plurality of external devices that are connected to a local network; and
   a line concentrator apparatus that unifies the plurality of external devices via the local network and connects the unified external devices to an external network,
   the line concentrator apparatus comprising:
      a first repeater hub;
      a second repeater hub;
      a switching hub, wherein
         when receiving data from the external network, the switching hub transmits the data which is received from said external network to the first repeater hub,
         when receiving from the second repeater hub information regarding a processing status of a first external device of the plurality of external devices, the switching hub determines whether or not to transmit the information to the external network,
      the first repeater hub transmits the data from the switching hub to all of the external devices that are connected to the local network, the first repeater hub transmitting the data, as it is, to all of the external devices equally, and
      the second repeater hub transmits the information received from the first external device of the plurality of external devices to external devices in the local network other than the first external device and to the switching hub, the information regarding current processing status of the first external device,
   each of the external devices comprising:
      a receive-only receiving device that receives the data which has been supplied from an external network to the line concentrator apparatus via the first repeater hub included in the line concentrator apparatus, and
      a transmitting/receiving device that, when the external device is executing processing of data received via the receive-only receiving device transmits information regarding its own data processing status to at least one other external device in the local network via the second repeater hub of the line concentrator apparatus and that, when at least one other external device executes processing, receives information regarding the data processing status from said at least one other external device executing processing via the second repeater hub included in the line concentrator apparatus, and
   the plurality of external devices themselves mutually select an external device best suited for processing the data, based on the information regarding the current processing statuses of the respective external devices, wherein the external devices are printing devices.

9. The information processing system as set forth in claim 8, wherein the switching hub of the line concentrator apparatus further comprises an identification device that identifies a type of content of the data supplied from said external network.

10. The information processing system as set forth in claim 8, wherein the line concentrator apparatus further comprises an arbitration device that selects an external device that is the most adequate for processing of the data, based upon information regarding processing statuses of the respective external devices, the information supplied from all of the external devices that are connected to the local network.

11. The information processing system as set forth in claim 8, wherein the external devices and the line concentrator apparatus are connected through a wireless communication connection.

12. The information processing system as set forth in claim 8, wherein at least one of the external devices is an image forming apparatus.

13. A method for managing an information processing system comprising a plurality of external devices that are connected to a local network, and a line concentrator apparatus that unifies the plurality of external devices via the local network and connects the plurality of external devices with an external network, the method comprising:
   transmitting, from a repeater hub of the line concentrator apparatus to all of the plurality of external devices connected to the local network, data received by the line concentrator apparatus from said external network, the data being transmitted as it is to all of the external devices equally;
   receiving information into the line concentrator apparatus from a first external device of the plurality of external devices, the information regarding a current processing status of the first external device;
   transmitting the received information from a switching hub of the line concentrator apparatus to an external device other than the first external device that is connected to the local network;
   when receiving data transmitted from the external network via the repeater hub, the plurality of external devices themselves mutually selecting, based upon the received data and the information regarding processing statuses of the external devices that are received from the switching hub, an external device among the plurality of external devices that is to execute processing of the data; and executing, using the selected external device, the processing of the data, wherein the external devices are printing devices.

14. The method for managing an information processing system as set forth in claim 13, wherein the plurality of external devices mutually select the external device that is to execute processing of the data such that at least one external device is reserved that is either in an idle state or almost finished processing.

15. A method for managing an information processing system comprising a plurality of external devices that are connected to a local network and a line concentrator apparatus that unifies the plurality of external devices via the local network and connects the plurality of external devices with an external network, the method comprising:

transmitting, from a first repeater hub of the line concentrator apparatus to all of the plurality of external devices that are connected to the local network, data received by the line concentrator apparatus via a switching hub of the line concentrator apparatus from said external network, the data being transmitted as it is to all of the external devices equally;

receiving into the line concentrator apparatus, by a second repeater hub of the line concentrator apparatus, information regarding a current processing status of a first external device of the plurality of external devices;

transmitting the received information from the second repeater hub of the line concentrator apparatus to an external device other than the first external device that is connected with the local network and to the switching when receiving the data from the external network, the switching hub of the line concentrator apparatus transmitting to the first repeater hub the data received from said external network;

when receiving from the second repeater hub information regarding the processing status of the first external device of the plurality of external devices, the switching hub determining whether or not to transmit the information to the external network;

when receiving data transmitted from the external network via the first repeater hub, the plurality of external devices themselves mutually selecting from the plurality of external devices, based upon the data and the information regarding processing statuses of the external devices that are received from the second repeater hub, an external device that is to execute processing of the data; and executing, using the selected external device, the processing of the data, wherein the external devices are printing devices.

16. The method for managing an information processing system as set forth in claim 15, wherein the plurality of external devices select the external device that is to execute processing of the data such that at least one external device is reserved that is either in an idle state or almost finished processing.

* * * * *